July 25, 1933.  H. M. ROBERTSON  1,919,258
KILN
Filed June 23, 1931   4 Sheets-Sheet 1
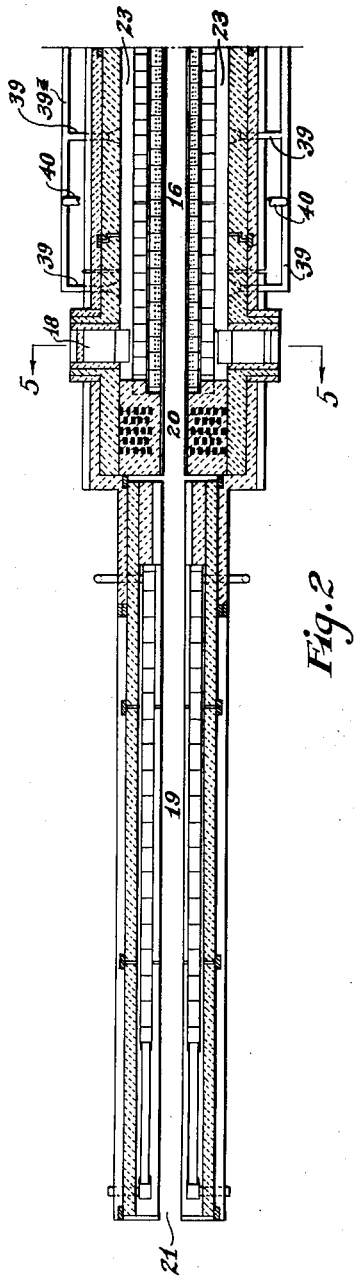
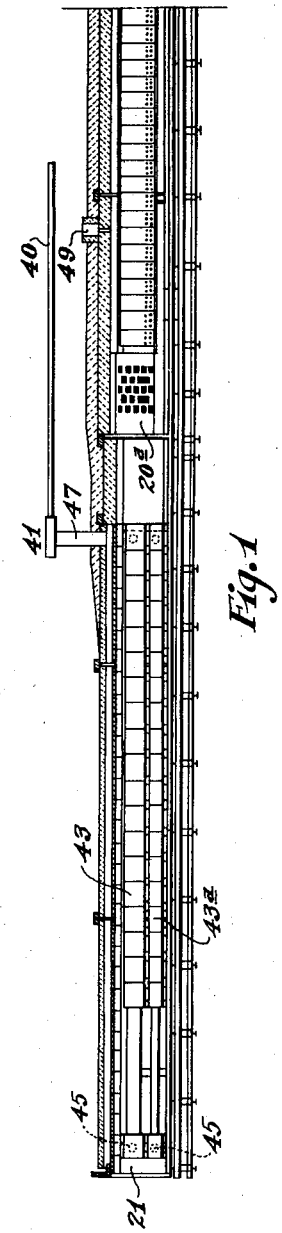
INVENTOR.
Harry M. Robertson
BY Geo. A. Pitts
ATTORNEY.

July 25, 1933.  H. M. ROBERTSON  1,919,258
KILN
Filed June 23, 1931  4 Sheets-Sheet 2
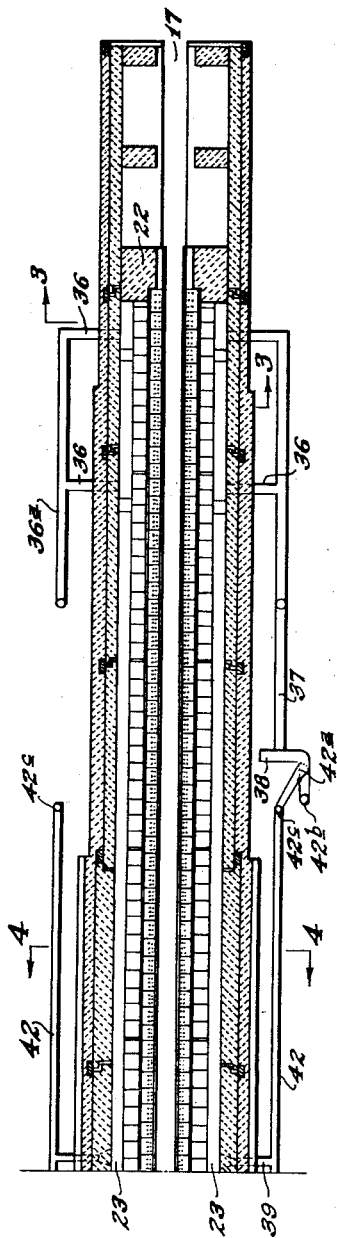
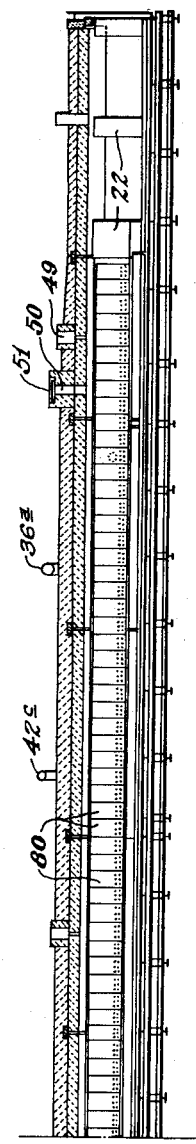
INVENTOR.
Harry M Robertson
BY Geo. B. Pitts
ATTORNEY.

INVENTOR.
Harry M. Robertson
BY Geo. B Pitts
ATTORNEY.

July 25, 1933.  H. M. ROBERTSON  1,919,258
KILN
Filed June 23, 1931  4 Sheets-Sheet 4

INVENTOR.
Harry M. Robertson
BY
Geo. B. Pitts
ATTORNEY.

Patented July 25, 1933

1,919,258

UNITED STATES PATENT OFFICE

HARRY M. ROBERTSON, OF CLEVELAND, OHIO

KILN

Application filed June 23, 1931. Serial No. 546,294.

This invention relates to a continuous tunnel kiln.

An object of the invention is to provide a tunnel kiln having an improved baffle which extends throughout the heating zone and which is of such construction that effective circulation of the products of combustion and ware space atmosphere and saving of fuel consumption results.

Another object of the invention is to construct a tunnel kiln having at either side of the ware space, combustion chambers each of which is provided throughout its length with a baffle constructed and arranged to direct the products of combustion below the ware, whereby such products are circulated upwardly through the ware to insure burning thereof.

Another object of the invention is to construct a tunnel kiln in which the inner side walls for the combustion chambers are of an improved form to simplify the construction, while maintaining strength and to effect a circulation of the products into the ware space, whereby they may flow upwardly through the central portion of the ware to burn the ware in an efficient manner with minimum expenditure of fuel and minimum waste of ware due to under-burning or over-burning thereof.

A still further object of this invention is to provide an improved baffle member or section which comprises a relatively thin refractory wall formed with one or more discharge ports for properly directing the flow of the gases into the ware space of a kiln and which may be used in multiple to provide a baffle of the desired extent.

Other objects of the invention will be apparent to those skilled in the art to which my invenion relates from the following description taken in connection with the accompanying drawings.

Figs. 1 and 1a together are vertical sections through a kiln embodying my invention.

Figs. 2 and 2a together are horizontal sections through the kiln.

Fig. 3 is a transverse section taken through the kiln substantially on the line 3—3 of Fig. 2a.

Fig. 4 is a section on the line 4—4 of Fig. 2a.

Figure 3:
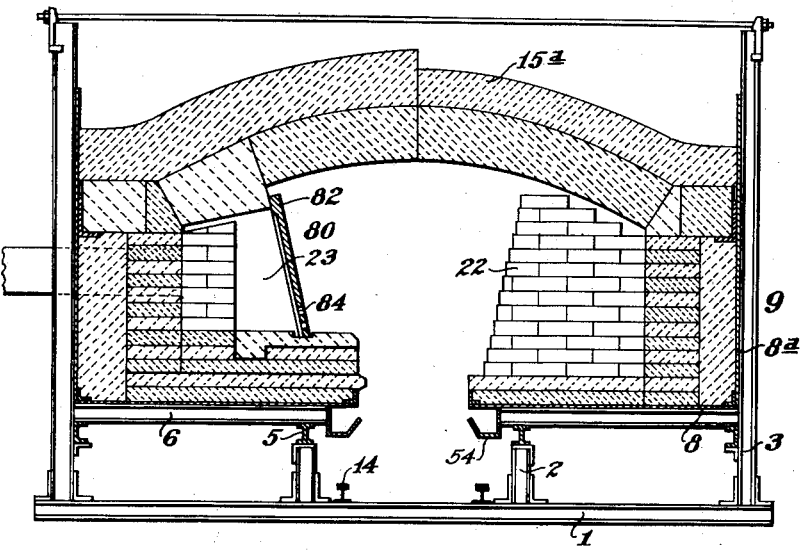

In the drawings, 1 indicates a plurality of transverse steel beams adapted to be laid on a suitable flooring or foundation. 2, 3, indicate spaced uprights suitably secured to the beams 1, the uprights 3 being connected by horizontal channels 4. The channels 4 and beams 5, which rest on the uprights 2, form a support for elevated beams 6 extending transversely inwardly from the uprights 3. The beams 6 are of a length to leave a wide space between their inner ends for a purpose which will later appear. All of the parts above referred to are rigidly secured together to form a supporting frame work for the kiln walls which rest on the beams 6 and against the uprights 3, the latter being connected at their upper ends by tie rods 7 in a well known manner. 8, 8a, indicate sheet metal plates laid on the beams 6 and against the uprights 3 to form a bottom and outer facing walls for the refractory material, bricks, slabs and blocks used in the construction of the kiln side walls 9, to form a space extending from end to end of the structure and constituting contiguous heating and cooling sections or zones for the ware to be treated. The lower portions of the side walls 9 are extended inwardly to form at either side of the ware space benches 10. The benches 10 provide between them a relatively narrow passage through which portions of the ware carriers 11 (see Fig. 5) extend. By supporting the walls of the kiln on the elevated beams 6, the frame 12 and wheels 13 therefor of the carriers 11 may be conveniently mounted below the benches 10 exteriorly of the kiln to prevent deterioration and distortion of these parts due to heat. By preference, the carrier wheels 13 run on tracks 14 provided on the beams 1.

The outer portion 9a of the side walls 9 may be formed of insulating material, such as diatomaceous earth. The inner portions 9b of the side walls and benches 10 are preferably formed of fire brick. On top of the side walls 9 are refractory members 15 forming abutments for an arch 15′, also formed of refractory material, such as fire bricks. That portion of the arch, which is over the heating zone, is preferably of sectional construction—see Figs. 3, 4 and 5—and may be insulated by a covering 15a of diatomaceous earth.

Figure 4:
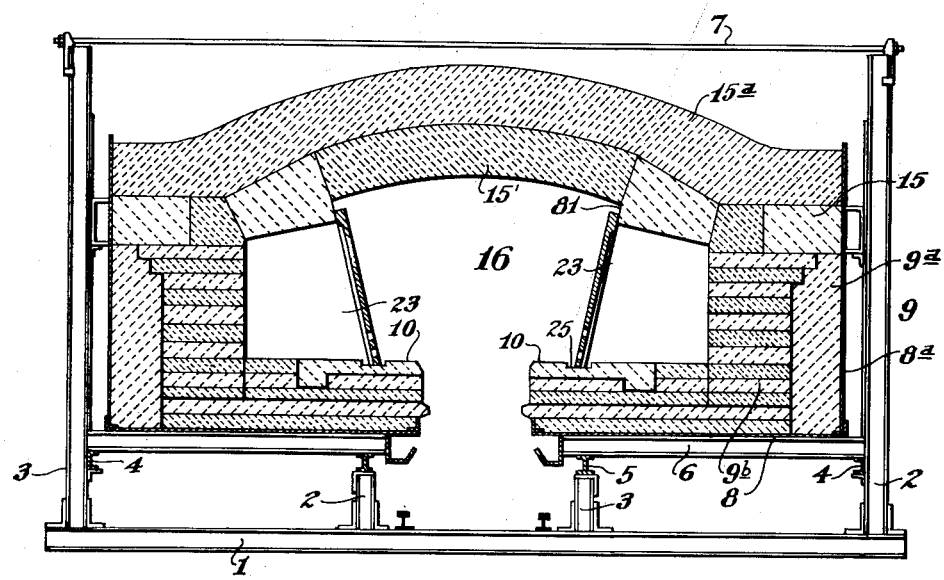
Figure 5:
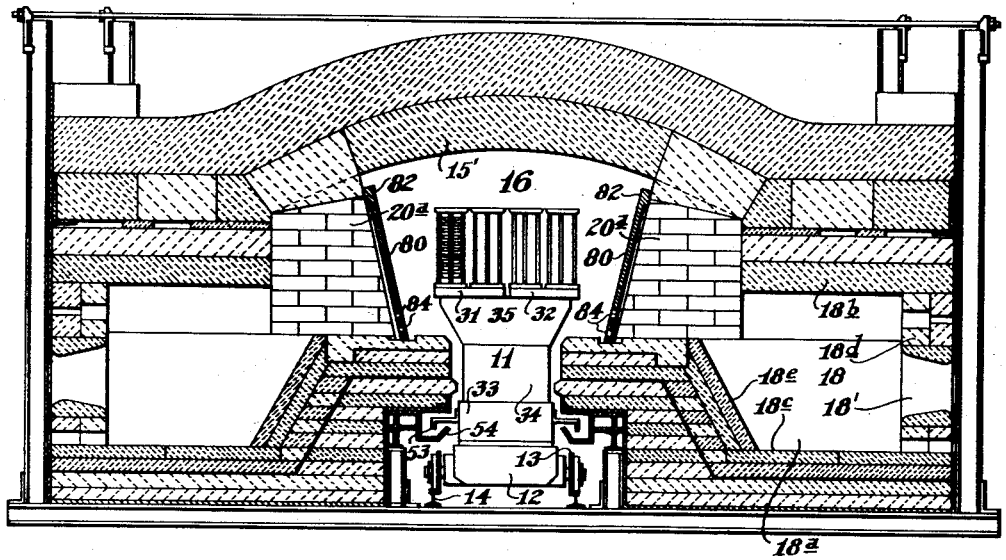
Fig. 5 is a section on the line 5—5 of Fig. 2, showing a loaded carrier in the ware space.

In Figs. 4 and 5, 16 indicates the heating or burning zone extending from a point adjacent the inlet end of the kiln, indicated at 17, Fig. 2a, to fire boxes or primary combustion chambers 18 disposed at either side of the ware space or passage. In Fig. 2, 19 indicates the cooling zone and 20 indicates an intermediate zone between the heating zone 16 and the cooling zone 19. The cooling zone extends from the zone 20 to the outlet for the ware, indicated at 21.

The inlet 17 and outlet 21 may be provided with doors (not shown) and tracks and transfer platforms or other means may be provided for conveying the carriers 11 from the outlet to the inlet for re-entry into the kiln after being re-loaded.

Adjacent the inlet end 17 at either side of the ware space, I provide a plurality of spaced pillars 22, which tend to prevent flow of cold air into the heating zone.

23 indicates the secondary combustion chambers (constructed as hereinafter set forth), extending along either side of the ware space, preferably throughout the heating zone 16, from the walls 20a, Fig. 5, forming the intermediate zone 20 to the innermost pillars 22, their inner portions being in communication with the fire boxes 18, as clearly shown in Fig. 5.

Each fire box 18 is constructed of refractory material, such as fire brick, its walls 18a being incorporated in the adjacent side wall 9 and arch 15′ in any well known manner to constitute a unitary structure. The fire boxes may be constructed to burn coal or similar fuel material, powdered coal, gas or oil. The construction shown is adapted for the combustion of oil or gas, but the equipment therefor is not shown. In the construction shown, the walls 18a of each box provide sides, a top 18b, a bottom 18c, a front wall 18d and an upwardly inclined rear wall 18e, which directs the products of combustion upwardly into the adjacent combustion chamber 23. The front wall 18d is provided with an opening 18′ into or through which the fuel burner extends.

Figure 7:
Fig. 7 is a lower edge view of the same.
Figure 6:
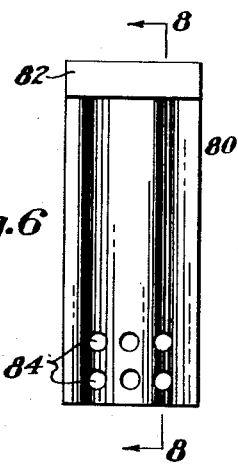
Fig. 6 is a detail inner face view of one of the baffle wall members.
Figure 8:
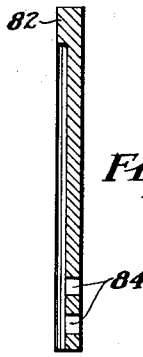
Fig. 8 is a vertical section taken on the line 8—8 of Fig. 6 through the baffle wall member.

At opposite sides of the heating zone 16 are disposed baffle walls which are composed of rows of baffles 80, shown in detail in Figs. 6, 7 and 8. These baffle walls extend from the upper surface of the adjacent bench 10, near its free edge, to the arch 15′ and form, together with the adjacent bench, the side wall 9 and the arch 15′ throughout the length of the heating zone, one of the secondary combustion chambers 23. The lower ends of the baffles 80 are set or locked between the side walls of a channel 25 formed in and extending longitudinally of the adjacent bench 10, and their upper ends rest against the face of a depending portion 81 of the arch 15′ to which the baffle may be sealed in a well known manner. As the top surfaces of the benches 10 form the bottoms of the combustion chambers 23, and are subjected to high temperatures, these surfaces are formed of high heat resisting refractory material.

Each baffle member comprises an integral structure formed of fire clay, refractories or other suitable material in any desired manner. Each baffle member 80 consists of a relatively thin wall adapted to be related edge to edge with adjoining members to form the front wall of the adjacent chamber. To impart strength to the wall, the members may be endwise corrugated, so that when in position the corrugations extend upward and provide substantially vertical channels or grooves alternately arranged at opposite sides of the wall. The baffle member 80 is provided with a flat thickened marginal head or flange 82 at its upper end forming an abutment shoulder, the enlargement being on the inner side of the wall and having a flat face to engage the portion 81. The lower portion of each baffle member 80 is formed with one or more relatively large outlets or ports 84 through which the products of combustion flow or circulate from the adjacent combustion chamber into direct contact with the ware. As will be understood from Fig. 5, the ware supports 31 on the carriers 11 are mounted in a plane above the ports 84 and they are formed with openings 32 extending longitudinally throughout their central portions, so that the products of combustion are directed below these supports and rise through the openings 32 and through the central portion of the ware. The products and gases then, due to their cooling, tend to flow downwardly in contact with outer portions of the ware, so that the inner and outer portions of the ware are simultaneously and substantially uniformly subjected to the heating medium. In operation, the fuel and air are supplied into the fire boxes, sufficient air under pressure being supplied to effect complete combustion in the chambers 23. The hot gases of combustion flow under pressure from the chambers 23 through the openings 84 horizontally into the ware space or heating zone 16 and upwardly through the openings 32 in the ware supports 31, to the space below the arch 15′ and portions thereof are returned downward at opposite sides of and in contact with the ware and at opposite sides of the support 31, where the gases or kiln atmosphere meet the jets of hot gases from the relatively large openings 84. The tendency of these jets is to further increase and maintain the circulation of the gases in the ware space. The gases or kiln atmosphere are ultimately withdrawn under the influence of the suction means to be later described. The combustion of the fuel creates a relatively high pressure in the combustion chambers, so that the hot gases flow through the openings 84 under relatively high velocity.

In the preferred form of construction, each baffle section is corrugated by reason of which certain advantages are attained; for example, the wall is reinforced from end to end; the resulting corrugations on the inner face of the baffle tend to retard the flow of the products of combustion through the adjacent chamber so that the products in expanding will flow through the openings 84; and the corrugations on the outer face of the baffle tend to retard flow of those portions of the gases, which circulate downwardly at the outer sides of the ware, longitudinally through the ware space but direct them downwardly for mixture with the gas jets issuing from the ports 84.

The frame 12 of the carriers supports a body member 33 on which one or more refractory members 34 rest. 35 indicates a plurality of transversely arranged, vertical slabs in spaced relation and supported on the members 34, and supporting the ware supports 31 in the manner above described.

The walls 20a at opposite sides of the intermediate zone 20 are of checkered formation and extend preferably upwardly from the benches 10, on which they are supported, to the arch 15, and are disposed between the heating and cooling zones. By constructing the walls 20a as described, they serve as a reservoir or storage for heat so that the ware passing from the heating zone 16 to the cooling zone 19 is not subjected to a sudden drop in temperature and they also operate to prevent drift of the products of combustion and gases into the cooling zone 19.

In Figs. 1a, 2a, and 3, 36 indicates a plurality of conduits leading from the outer end portions of the combustion chambers, through the side walls 9, two conduits for each chamber being shown. The conduits 36 are connected to a discharge main 36a and the latter is connected to the intake side of a suction means 37, such for example a power driven fan mounted in a casing 38 the function of which is to reduce the atmospheric pressure in the outer end portions of the two combustion chambers 23 and the heating zone to induce a flow of the products of combustion through both the chambers and the zone and to finally discharge or exhaust the remaining portions of the gases not discharged into the ware space.

In Figs 1, 2 and 2a, 39 indicates a plurality of nozzles leading into each combustion chamber 23, the purpose thereof being to supply air for combustion purposes according to the conditions desired in the ware space. The air supply for the nozzles 39 comprise conduits 39a connected to a main 40 which leads from the outlet of a power driven suction means 41 to be later referred to. The conduits 39a are also connected by conduits 42 with the outlet for the casing 38, so that when desired the products of combustion exhausted from the outer ends of the chambers 23 may be returned to the chambers 23 at a point adjacent the fire boxes 18. Each conduit 36 and 39 is provided with a valve or damper to control the flow therethrough in relation to each other; the main 40 may be provided with a valve to control the flow of air to the conduits 39a; the main 42 may have a valve 42a to regulate the flow of the products through it to the nozzles or to discharge them into a chimney 42b. The conduits at opposite sides of the kiln are connected by a pipe 42c.

43, 43a, indicate upper and lower conduits extending along either side of the cooling zone 19 above the benches and in opposed relation to the ware as it moves through the zone. Each lower conduit 43a rests on the adjacent bench 10; each upper conduit 43 rests on a refractory support 44 which is supported on the adjacent lower conduit 43a. The portions of the conduits 43, 43a, near the outlet 21 may be formed of metal; the remaining portions comprise sections formed of refractory material, such as fire clay. The outer end of the conduits 43, 43a are connected to air intake pipes 45; the inner ends of these conduits are connected to air discharge pipes 46. The pipes 46 are connected in a suitable manner to a conduit 47 which in turn is connected to the intake of the suction means 41 comprising a power driven fan. The suction means 41 induces a flow of air into the intake 45 and through the conduits 43, 43a, this air serving to absorb heat units due to heat radiating from the ware as it moves through the zone 19, whereby the ware is cooled sufficiently to be discharged from the kiln.

The arch 15' may be provided with one or more openings 49 for pyrometers and also a ventilating opening 50 controlled by a damper 51, as shown in Figs. 1 and 1a. The arch 15' for the ware space between the heating zone 16 and the inlet 17 may be provided with an outlet 52, Fig. 1a, connected to a suction means (not shown) or one of the suction means already referred to, so that cold air may be exhausted from this space.

Suitable means may be provided for sealing the zones 16, 19, 20, to prevent the escape of heat or intake of excess air into the cooling zones; for example, the vertical sides of the benches 10 throughout the heating zone may be provided with projecting ribs 53 which co-operate with the carriage members 34 to prevent flow downwardly of the products of combustion and heat; also the body member 33 is provided on its sides with metal members 53 having depending flanges which run in sand or water held in troughs 54 to effect sealing of the ware space.

By regulating the air supplied to the chambers 23 the combustion of the fuel therein may be regulated at will.

The number and size of the ports 84 in the baffle members or sections 80 may be varied and any desired number of the baffle members 80 may be formed with openings 84 to provide for flow of the combustion gases into the ware space throughout any predetermined area of the heating zone.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a tunnel kiln having side walls and an arch forming contiguous heating and cooling zones through which ware moves, carriers having supports for ware for moving the ware through said zones, benches extending longitudinally of said heating zone at opposite sides thereof, and a sectional baffle wall extending from each bench to the arch throughout the length of the latter and forming with said bench and arch and adjacent side wall a combustion chamber, said wall being formed with openings below said ware supports.

2. In a tunnel kiln having side walls and an arch, baffles extending along and in spaced relation to a portion of the side walls of the kiln to form combustion chambers, each baffle comprising a row of vertically disposed plates connected in end to end relation to form a wall of uniform thickness throughout its area and having ports therethrough in their lower portions for the passage of hot gases from the adjacent combustion chamber into contact with the ware, and fire boxes communicating with said combustion chambers.

3. In a tunnel kiln having side walls and an arch forming contiguous heating and cooling zones through which ware moves, and baffle walls disposed in spaced relation to said side walls to form combustion chambers, said walls having vertical channels therein and ports through their lower portions opening into said heating zone for supplying hot gases into said heating zone, said ports and said vertical channels adapted to create a centrally upward flow of hot gases between the ware and a downward flow of gases at the opposite sides of the ware passing through the kiln.

4. In a tunnel kiln having side walls and an arch forming contiguous heating and cooling zones through which ware moves, and baffle members mounted within the kiln in spaced relation to its side walls to form combustion chambers between which the ware moves, said baffle members having ports through their lower portions for directing hot gases from the combustion chambers to the zone beneath the ware for passage of the hot gases upwardly between the ware, said baffle members having corrugated inner faces providing vertical channels for directing the hot gases downwardly at opposite sides of the ware and retarding the outflow of the hot gases lengthwise of the kiln.

5. In a tunnel kiln having side walls and an arch providing a longitudinal zone through which ware passes, baffle members disposed in spaced relation to the side walls to form combustion chambers and having ports for directing the hot gases from said chambers against the ware, said baffle members having corrugated inner faces for retarding the longitudinal travel of the hot gases in the zone, and means for inducing a draft through the zone.

6. In a tunnel kiln having side walls and an arch providing a longitudinal zone through which ware moves, and rows of independent baffle plates disposed in spaced relation to the inner faces of said side walls, each of said baffle plates being transversely corrugated to provide vertically extending channel portions at opposite sides of the plate for inducing vertical currents of hot gases, said baffle plates also having through ports in their lower ends for directing hot gases into the bottom of said zone for passage upwardly through the ware and reflecting the hot gases downwardly through said channel portions of the baffle plates.

7. A baffle member for use in a tunnel kiln, comprising a relatively thin wall having ports through its lower end portion and provided with a relatively thick, transverse bead portion at its upper end.

8. A baffle member for use in a tunnel kiln, comprising an elongated relatively thin wall adapted to be positioned substantially in an upright position in the kiln and having a bead at its upper end for seating against an adjacent portion of the kiln wall, said wall having jet openings through its lower end for directing hot gases into the lower portion of the ware space of the kiln.

9. In a tunnel kiln having side walls and an arch providing a longitudinal zone through which ware passes, baffle members disposed in spaced relation to the side walls to form combustion chambers and having ports for directing the hot gases from said chambers against the ware, each said baffle member comprising a corrugated wall for retarding the longitudinal travel of the hot gases in the zone and for retarding the longitudinal flow of the products in the adjacent combustion chamber.

10. A baffle member for use in a tunnel kiln, comprising a transversely corrugated relatively thin wall having ports through its lower end portion and provided with a relatively thick, transverse bead portion at its upper end.

HARRY M. ROBERTSON.